United States Patent [19]
Bringley et al.

[11] Patent Number: 5,886,359
[45] Date of Patent: *Mar. 23, 1999

[54] X-RAY DECTECTOR, DETECTION ASSEMBLY, AND METHOD

[75] Inventors: Joseph F. Bringley; David Paul Trauernicht; David Steven Weiss, all of Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 662,586

[22] Filed: Jun. 13, 1996

[51] Int. Cl.⁶ .................................................. G01T 1/24
[52] U.S. Cl. ................. 250/580; 250/370.09; 250/483.1; 378/98.8
[58] Field of Search .............................. 250/580, 361 R, 250/369, 370.09, 472.1, 483.1, 484.2; 378/98.8

[56] References Cited

U.S. PATENT DOCUMENTS

| | | | |
|---|---|---|---|
| 3,615,414 | 10/1971 | Light . | |
| 4,175,960 | 11/1979 | Berwick et al. . | |
| 4,514,481 | 4/1985 | Scozzafava et al. . | |
| 4,578,334 | 3/1986 | Borsenberger et al. . | |
| 4,666,802 | 5/1987 | Hung et al. . | |
| 4,689,487 | 8/1987 | Nishiki et al. . | |
| 4,701,396 | 10/1987 | Hung et al. . | |
| 4,719,163 | 1/1988 | Staudenmayer et al. . | |
| 4,996,432 | 2/1991 | Saitou | 250/370.01 |
| 5,051,597 | 9/1991 | Lewis et al. | 250/474.1 |
| 5,220,170 | 6/1993 | Cox et al. | 250/370.09 |
| 5,235,191 | 8/1993 | Miller | 250/486.1 |
| 5,254,480 | 10/1993 | Tran . | |
| 5,300,784 | 4/1994 | Fender et al. . | |
| 5,313,066 | 5/1994 | Lee et al. . | |
| 5,519,751 | 5/1996 | Yamamoto et al. | 378/98.8 |
| 5,528,043 | 6/1996 | Spivey et al. | 250/370.09 |
| 5,549,844 | 8/1996 | Bringley et al. | 252/301.4 H |
| 5,556,716 | 9/1996 | Herron et al. | 428/688 |

FOREIGN PATENT DOCUMENTS

| | | |
|---|---|---|
| 0 313 322 A | 4/1989 | European Pat. Off. . |
| 58-137781 | 8/1983 | Japan ..................................... 250/580 |
| WO 82/01124 | 4/1982 | WIPO . |

OTHER PUBLICATIONS

L. E. Antonuk, et al., "Radiation Response of Amorphous Silicon Imaging Arrays at Diagnostic Energies", 1993, IEEE Transaction on Nuclear Science, vol. 41, No. 4, Part 1, pp. 1500–1505.

J. Yorkston et al., "Evaluation of the MTF for a–Si:H Imaging Arrays", 1994, SPIE Conference Newport Beach, Physics of Medical Imaging, Proceedings of The International Society for Optical Engineering:, SPIE vol. 2163, p. 141.

B. G. Streetman, "Solid State Electronic Devices", 1990, 3rd edition, Prentice Hall, New Jersey, pp. 187–189.

"Design and Characteristics of a Digital Chest Unit", (1981), Digital Radiography, SPIE vol. 314, pp. 160–165.

J. A. Rowlands et al., "A Photoinduced Discharge Method for Digital Mammography", (1991), Med. Phys., vol. 18, pp. 421–431.

(List continued on next page.)

*Primary Examiner*—Constantine Hannaher
*Assistant Examiner*—Darren M. Jiron
*Attorney, Agent, or Firm*—William F. Noval

[57] ABSTRACT

An x-ray detector, detection assembly, and method of using the detector and detection assembly. The detector is used with an x-ray source and has a converter including a mass of prompt emitting radiographic phosphor particles and a photoconductive binder. The mass of particles is dispersed and embedded in the binder. The phosphor absorbs x-rays emitted by the source and emits longer wavelength actinic radiation responsive to the x-rays. The photoconductive binder absorbs the actinic radiation and produces electron-hole pairs responsive to the actinic radiation.

20 Claims, 3 Drawing Sheets

OTHER PUBLICATIONS

V. Schiebel et al., "Fluoroscopic X–Ray Imaging with Amorphous Silicon Thin–Film Arrays", (1994), SPIE Medical Imaging, vol. 2163, pp. 129–140.

L. E. Atonuk et al., "A Large Area, High–Resolution a–Si:H Array for X–Ray Imaging", (1994), Mat. Res. Soc. Symp. Proc., vol. 336, pp. 855–860.

L. E. Antonuk, "Thin–Film, Flat–Panel Imagers—A Coming Revolution in Megavoltage and Diagnostic X–ray Imaging?", (1993), Physica Medica, vol. 9, pp. 63–67.

L. E. Antonuk et al., "Large Area, Flat–Panel a Si:H Arrays for X–Ray Imaging", (1993), Rodney Shaw ed., Physics of Medical Imaging, SPIE vol. 1896, p. 18.

J. W. May, et al., "High–resolution computed radiography by scanned luminescent toner xeroradiography", (1993), Physics of Medical Imaging, SPIE vol. 1896, pp. 296–312.

U. Schiebel, et al., "Fluoroscopic X–Ray Imaging with Amorphous Silicon Thin–Film Arrays", (1994), SPIE Medical Imaging, pp. 1–12.

Wei Zhao, et al., "A large area solid–state detector for radiology using amorphous selenium", (1992), SPIE Medical Imaging VI: Instrumentation, vol. 1651, pp. 134–143.

X-RAY DECTECTOR, DETECTION ASSEMBLY, AND METHOD

FIELD OF THE INVENTION

The invention relates to x-radiation imaging devices and methods of making and using them and more particularly relates to x-ray detectors, detection assemblies, and preparation methods.

BACKGROUND OF THE INVENTION

Visible images of the results of exposing a patient or object of interest (hereafter "subject") to x-radiation or other high energy radiation (referred to collectively herein as x-radiation or x-rays or the like) can be divided into two broad categories: immediate images and delayed images. Immediate images are commonly producing by impinging transmitted or reflected x-radiation at a screen containing a prompt emission radiographic phosphor. The radiographic phosphor emits light in response to the x-radiation. This procedure, in medical x-ray imaging, is commonly referred to as "fluoroscopy". Delayed images can be produced by directing the x-radiation at photographic film. The shortcoming of this approach is that the required x-radiation dosage is quite high. An alternative approach is to place a sheet of photographic film against a screen containing prompt emission radiographic phosphor and to direct the x-radiation at the screen. The screen is costly, but has a relatively long useful life. The photographic film characteristics are tailored to complement the emission produced by the radiographic phosphor. One shortcoming of this approach is that the film and screen must be enclosed within a cassette or other light-tight enclosure to prevent ambient light from exposing the film. Another shortcoming is the broadening of image features that occurs as a result of the spatial separation of a first plane at which the x-ray image is absorbed and the light image generated and a second plane at which the light image is absorbed. The spatial separation can also be exacerbated by localized gaps between the screen and film due to dust particles or irregularities in the cassette. Another process used for producing delayed x-radiation images is known as computed radiography. A x-ray image is captured on a screen containing a storage radiographic phosphor. The latent image on the storage screen is then exposed to a rastorized beam of radiation which causes the storage phosphor to emit radiation on another wavelength. The emitted radiation is captured and displayed or used to print an image. A particular shortcoming of computed radiography is the complexity of the radiation capture system.

As a result of the above shortfalls, many efforts have been made to replace conventional systems with detectors that can provide an immediate digital image. One type of detector uses a technique called, "line scanned radiography". In this technique, x-rays are collimated through a small slit to produce an x-ray fan beam, which after passing through the subject impinge on a detector strip. Scintillators or x-ray phosphors (hereafter collectively referred to as "phosphors") are positioned in the detector strip between the x-ray beam and a photodiode or photosensor. "Design and Characteristics of a Digital Chest Unit", *Digital Radiography*, SPIE Vol. 314, (1981), pp. 160–165, teaches such a detector strip having a one-dimensional linear silicon photodiode array. While this approach is cost effective, it has the shortcoming that the fan beam and detector, or alternatively the subject, must be translated to produce a two-dimensional image.

U.S. Pat. No. 5,254,480 to Nang T. Tran discloses a process for producing a solid state radiation detector. The detectors produced have an intensifying screen or layer of prompt emitting phosphor overlying a photosensitive layer. In one embodiment, the photosensitive layer is an array of photodiodes. In another embodiment, the photosensitive layer has a pixellated electrode overlying a continuous photoconductor layer and a second electrode. These detectors suffer from the shortcoming that the light emitted by the phosphor is subject to lateral spread after it is emitted from the phosphor layer, resulting in image blur or reduced resolution. The photosensor based detectors just described also tend to suffer additional problems including: very high cost of manufacture; extreme physical fragility; low resistance to damage from x-ray radiation; and configurational complexity.

A variety of two-dimensional digital x-ray detectors are known. An x-ray detector employing an amorphous selenium detector is described in "X-ray imaging using amorphous selenium: "A photoinduced discharge method for digital mammography", J. A. Rowlands et al., *Med. Phys.*, Vol. 18, (1991) p. 421. In this system, amorphous selenium plates are employed as the x-ray detector and the electrostatic image formed on the plate is then read out electronically. This detector is complex, and utilizes selenium which is relatively inefficient in capturing x-rays.

U.S. Pat. No. 5,313,066 to Lee et al discloses an x-ray detector having a photoconductive layer that is responsive to both actinic and x-ray radiation. The photoconductive layer includes a particulate photoconductor dispersed in a photoconductive polymer. The particulate photoconductor is employed as an x-ray absorber which converts the x-rays into electron-hole pairs which then transport through the photoconductive polymer for detection. (The photoconductive polymer itself is minimally absorptive of x-radiation.) This detector has the shortcomings that photoconductors tend to be inefficient x-ray absorbers and transfer of electron-hole pairs from the particulate photoconductor to the polymeric photoconductor is subject to a variety of difficult constraints including the work function necessary for the transfer and the negative effects of any inhomogeneities at the interface between the particulate and polymeric photoconductors.

It would thus be desirable to provide an improved x-ray detector, detector assembly and method that can exhibit both good x-ray absorption efficiency and minimizes lateral spread of light emitted by the phosphor.

SUMMARY OF THE INVENTION

The invention is defined by the claims. The invention, in its broader aspects, provides an x-ray detector, detection assembly, and method of use. The detector is used with an x-ray source and has a converter including a mass of prompt emitting radiographic phosphor particles and a photoconductive binder. The mass of particles is dispersed and embedded in the binder. The phosphor absorbs x-rays emitted by the source and emits longer wavelength actinic radiation responsive to the x-rays. The photoconductive binder absorbs the actinic radiation and produces electron-hole pairs responsive to the actinic radiation.

It is an advantageous effect of at least some of the embodiments of the invention to provide an improved x-ray detector, detector assembly and method which can exhibit both good x-ray absorption efficiency and minimizes lateral spread of light emitted by the phosphor.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 1:
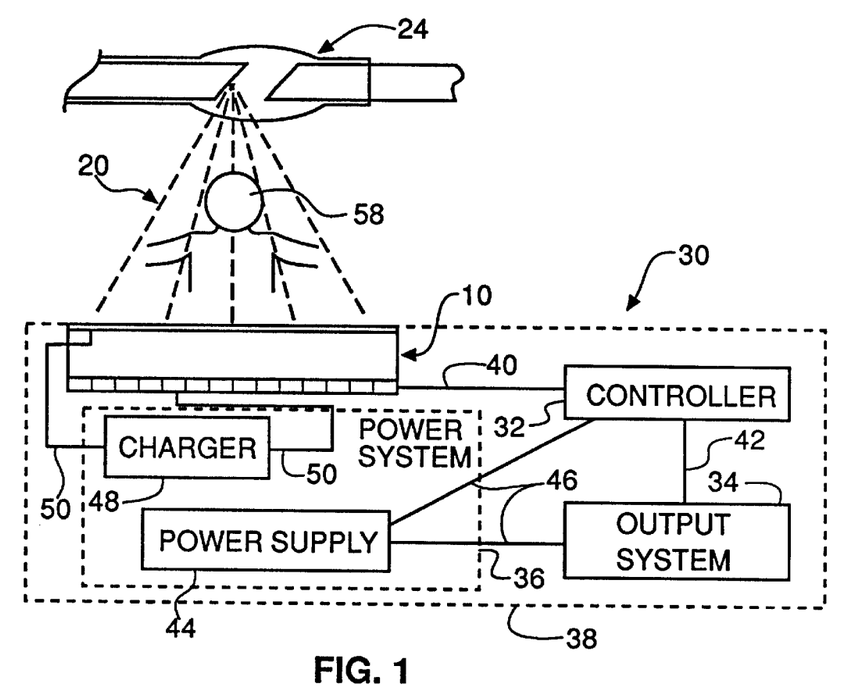
FIG. 1 is a diagrammatical view of an embodiment of the improved x-ray detector assembly of the invention. The x-ray detector assembly is illustrated in use with an x-ray source in producing an x-ray image of a subject.
Figure 2:
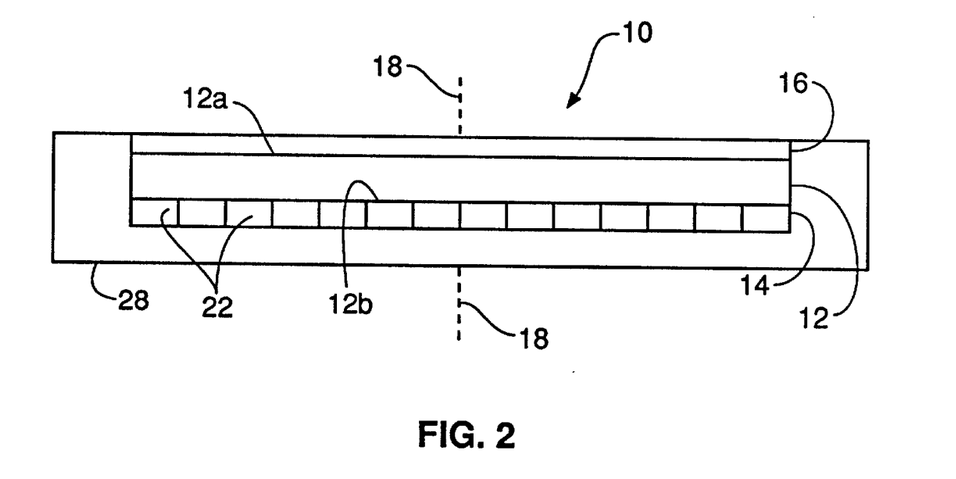
FIG. 2 is a semi-diagrammatical cross-sectional view of the embodiment of the improved x-ray detector of the invention from the x-ray detector assembly of FIG. 1. Dimensions are exaggerated for clarity.

Referring now to FIGS. 1 and 2, the improved x-ray detector 10 includes a converter 12 and primary and secondary electrodes 14,16. The converter 12 has a mass of prompt emitting phosphor particles dispersed in a photoconductive binder. The phosphor particles absorb x-rays emitted by a radiation source and emit longer wavelength radiation (hereafter also referred to as "actinic radiation") responsive to the x-rays. The photoconductive binder absorbs the actinic radiation and produces electron-hole pairs responsive to the actinic radiation. Since light emitted by phosphor particles is quickly absorbed by the photoconductive binder surrounding the particles and the charges produced have minimal lateral spread during transport, the resolution of the improved x-ray detector is largely independent of converter thickness. This permits the use of a relatively thick converter which has relatively greater x-ray stopping power and can be used with lower radiation exposures.

Figure 3:
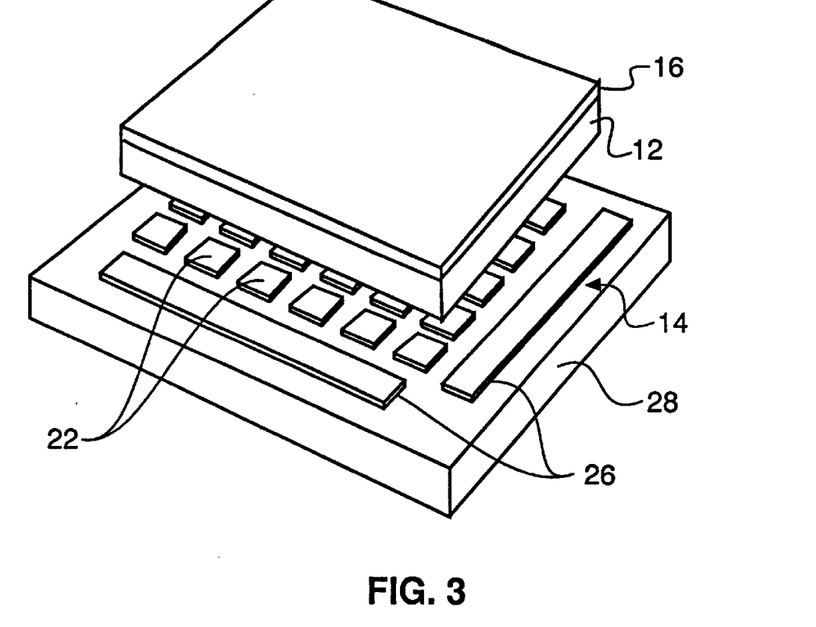
FIG. 3 is a semi-diagrammatical perspective view of the improved x-ray detector of FIG. 2. For clarity, structures are simplified, dimensions are exaggerated and the converter and secondary electrode are illustrated as separated from the primary electrode.

The detector 10 is illustrated in FIGS. 1 and 2 as being a unitary planar structure having its largest dimension, its length, substantially perpendicular to the main angle of incidence (beam axis 18) of a primary x-ray beam 20. (The second dimension of the detector 10 visible in FIGS. 1 and 2 is its thickness, which is exaggerated for clarity. Other dimensions are similarly exaggerated for clarity in other figures.) The second largest dimension of the detector 10, as shown in FIG. 3, is its width, which in FIG. 1 is also substantially perpendicular to the beam axis of the primary x-ray beam 20. Each of the elements 10–16 is a flat layer and the primary electrode 14 is divided into an array of pixel units 22. As a matter of convenience, the detector 10 is generally described herein in terms of this planar embodiment; however, the invention is not limited to this embodiment. For example, the improved x-ray detector need not be planar. The detector can have a simple curved or complex three dimensional shape. Similarly, the x-ray beam 20 can be inclined relative to the detector 10. Both electrodes 14,16 can be non-pixellated. Other variations of the invention will be apparent to those of skill in the art.

The phosphor can be chosen from those well known in the art for radiographic intensifying screens. Examples of such phosphors include x-ray prompt emission phosphors such as: activated gadolinium oxysulfide, $CaWO_4$, activated $Gd_2O_3$, activated $Y_2O_3$, $YTaO_4$, and activated $YTaO_4$, activated lanthanum oxyhalides, activated lanthanum oxysulfide, activated hafnium oxides, activated barium hafnate, activated cesium iodide, and activated alkali halides such as RbBr:Tl, activated calcium and strontium sulfides, and activated barium and strontium sulfates. X-ray storage phosphors exhibit some prompt emission, and although not preferred, could also be used. Examples of such storage phosphors include: activated alkaline earth fluorohalides such as BaFBr:Eu and $BaFBr_{1-x}I_x$:Eu, activated alkali halides such as RbBr:Tl, and activated barium bromosilicates. In certain applications, cathode ray and ultraviolet sensitive phosphors may be used such as: activated yttrium oxide, activated alkaline earth halophosphates such as $Ca_5(PO_4)_3(F,Cl)$ doped with Sb and Mn, activated yttrium oxosulfide, activated zinc or cadmium sulfide, activated zinc silicates, activated yttrium aluminates and gallates, yttrium silicates, activated indium borate, activated alkaline earth aluminates, activated rare-earth borates, and activated rare-earth phosphates. The phosphor can be chosen based on the knowledge of one skilled in the art as to how to select a particular phosphor host lattice and activator or activators to provide high luminescent efficiency and desired spectral characteristics or can be selected simply by trial and error. Phosphor particle size, size distribution, and morphology for the converter can be the same as for phosphors used in intensifying screens. For example, a suitable median phosphor particle size is between about 0.5 and about 40 micrometers and a preferred median particle size is between 1 and about 20 micrometers, for reasons of ease of formulation, as well as optimizing light emission properties, such as speed, sharpness and noise. The techniques for preparing such phosphors and producing the material with suitable particle size and morphology are well known in the art.

The phosphor particles are embedded in the binder, that is, substantially all the particles are covered by the photoconductive binder on all sides. It is highly preferred that the binder be highly absorptive of the actinic radiation emitted by the phosphor, such that the actinic radiation travels only a very short distance within the binder before being absorbed. These parameters of the binder can be expressed, in quantitative form, as a preference that the actinic radiation in the binder have a median path length of about 30 micrometers or less.

The short median path length of the actinic radiation in the binder is based on absorption by one or more agents in the binder. It is generally preferred that absorption of the actinic radiation be predominantly due to absorption by a charge generation agent rather than by other constituents of the binder or by phosphor particles. The term "charge generation agent" is used herein to refer to the smallest chemical moiety in the binder that generates charge carriers (holes and electrons) on absorption of light. The moieties can be small molecules, particulates, pendent groups, polymeric or oligomeric subunits, and/or molecular complexes.

The binder includes a binding agent. The term "binding agent" is used herein to refer to a chemical species that binds the charge generation agent and phosphor particles together and provides physical integrity for the converter. The binding agent may or may not be the same chemical species as the charge generation agent. It is preferred that the binding agent be a film-former, i.e., be capable of forming a self-supporting film, and that the binding agent have a fairly high dielectric strength and good electrically insulating properties. The binding agent, if different than the charge generation agent, should preferably also provide little or no interference with the generation and transport of charges in the converter. The binding agent can also be selected to provide additional functions, such as adherence to the electrodes.

The exact choices of charge generation and binding agents and their relative concentrations is dictated by a number of factors including the overall efficiency of the photoreceptor required, the mobility of carriers, dark-current and spectral match of the phosphor to the photodetector. Experimental techniques to measure these properties are well known to one skilled in the art.

A variety of materials can be used for the photoconductive agents (also referred to herein as charge generation agents) and binding agents, however, many materials present practical difficulties and are not preferred. For example, the phosphor particles can be dispersed in a layer of inorganic photoconductor, such as amorphous selenium, CdSe, or PbTe; however, structural integrity problems are likely to present significant problems with these materials. Similarly, the phosphor particles can be dispersed along with particles of organic or inorganic photoconductor in a polymeric binder. Examples of such photoconductor particles include: phthalocyanines, perylenes, bisazo and trisazo compounds, and squaraine pigments. These materials can present dispersal problems, since it is desirable that each phosphor particle be completed surrounded by the charge generation agent, unless very small particles are used.

Examples of binders include a wide variety of film-forming polymers: styrene-butadiene copolymers; vinyl toluene-styrene copolymers; styrene-alkyd resins; silicone-alkyd resins; soya-alkyd resins; vinylidene chloride-vinylchloride copolymers; poly(-vinylidene chloride); vinylidene chloride-acrylonitrile copolymers; vinyl acetate-vinyl chloride copolymers; poly(vinylacetals), such as poly(vinyl butyral); nitrated polystyrene; poly(methylstyrene); isobutylene polymers; polyesters, such as poly{ethylene-co-akylenebis(alkyleneoxyaryl) phenylenedicarboxylate}; phenol-formaldehyde resins; ketone resins; polyamides; polycarbonates; polythiocarbonates; poly{ethylen-coisopeopyliden-2,2-bis(ethylenoxyphenylene)-terephthalate}; copolymers of vinyl haloacrylates and vinyl acetate such as poly(vinyl-m-bromobenzoate-covinyl acetate); chlorinated poly(olefins), such as chlorinated poly(ethylene); cellulose derivatives such as cellulose acetate, cellulose acetate butyrate and ethyl cellulose; and polyimides, such as poly{1,1,3-trimethyl-3-(4'-phenyl)-5-indane pyromellitimide}. Examples of film-forming polymers which are particularly desirable from the viewpoint of minimizing interference with the generation or transport of charges include: bisphenol A polycarbonates and polyesters such as poly[(4,4'-norbornylidene)diphenylene terephthalate-co-azelate].

It is preferred that the binder be substantially homogeneous. In some currently preferred embodiments of the invention, subunits of a polymer form a chain of photoconductive complexes with another component. (These materials are also referred to herein as "polymeric photoconductors".) In these materials the polymeric photoconductor is both charge generation agent and binding agent. With these materials, phosphor particles can be easily surrounded by charge generation agent. Suitable polymeric photoconductors are those used in electrophotography. Suitable examples of such polymeric photoconductors include dye polymer complexes such as the complex between a pyrrilium dye and bisphenol A polycarbonate and donor acceptor charge transfer complexes such as that of poly(N-vinyl)carbazole and 2,4,7-trinitro-9-fluorenone.

In other currently preferred embodiments of the invention, the charge generation agent is non-polymeric and is dispersed on a molecular or substantially molecular basis in a film-forming polymer. A specific example of such a binder is the complex formed between bisphenol A polycarbonate and 4-(4-dimethylaminophenyl)-2,6-diphenylthiapyrylium perchlorate.

The converter can include more than one charge generation agent and can also include one or more agents to improve the efficiency of charge transport through the converter. Specific examples of hole transporting charge transport agents include: aminoarylalkanes,arylamines, poly(phenylene vinylene)s, polysilylenes, polygermylenes, poly(N-vinylcarbazole), hydrazones, enamines, pyrazolines, and oxazoles. Examples of electron transporting charge transport agents include: diphenoquinones, the complex between poly(N-vinyl carbazole) and 2,4,7-trinitro-9-fluorenone, the complex between bisphenol A polycarbonate and 4-(4-dimethylaminophenyl)-2,6-diphenylthiapyrylium pherchlorate, 4-n-butoxycarbazol-9-fluorenylidene malononitrile, 2-t-butyl-9,10-N,N'-dicyano-anthraquinonediimine, 1,1-dioxo-2-(4-methylphenyl)-6-phenyl-4-(dicyanomethylidene)thiopyran.

The converter can include a variety of addenda in addition to the phosphor, charge generation agent, binding agent, and any charge transport agent. For example, the converter can include one or more secondary binding material. Specific examples of such materials include the film-forming polymers previously mentioned. It is highly preferred that the binding agent and any secondary binding material be miscible so as to produce a converter material having a single phase (not counting the phosphor particles and any other particulates). A converter material having two or more phases can be utilized if charge transport and charge generation properties are not unacceptably degraded.

Another addenda that can be included in the converter is pigment. (The term "pigment" is sometimes used in the photoconductor art to refer to certain, very insoluble charge generation or charge transport material. The term "pigment" is intended here to refer to electromagnetic radiation absorbing or reflecting materials that do not also function in the converter to provide charge generation or transport.) For example, actinic radiation absorbing pigment can be included in the converter to reduce the median path length of the actinic radiation. X-ray absorbing pigment can be included in the converter to reduce the median path length of x-rays in the converter. Neither type of pigment is ordinarily preferred; however, one or both types of pigments could be used in applications in which it is desirable to reduce the sensitometric speed of the converter.

Prior to use of the detector 10 an electrical field is imposed across the electrodes 14,16. Charge migration from the charge generation agent to the electrodes 14,16 is at least substantially parallel to that field. Because of this, the converter 12 can be relatively thick; yet still function, in effect, like a single imaging plane of negligible thickness. A practical limitation on the thickness of the converter 12 is that the greater the converter 12 thickness the higher the electrical field required for uniform initial charging. A desirable initial field strength for the detector 10 is in the range of about $1 \times 10^4$ to about $1 \times 10^6$ volts/cm. It is further desirable that the electrical field imposed across the electrodes 14,16 not be so great as to present a risk of arcing over and thus damage to the detector 10. A practical maximum thickness for the converter 12 is about 1 mm. Minimum thickness of the converter 12 is largely a function of the x-ray cross-section of the phosphor and the signal to noise ratio of the system as a whole. Convenient thicknesses are in the range of about 100 to about 600 micrometers.

The converter 12 is described above in terms of a single uniform layer between the two electrodes 14,16. This corresponds in structure to an electrophotographic element of the type commonly referred to as a "single layer element" or "single active layer element". The converter can also have a structure corresponding to another type of electrophotographic element: a "multiactive element" or "multiple active layer element". Single active layer elements are so named because they contain only one layer that is active both to generate and to transport charges in response to exposure to actinic radiation. Multiactive layer elements are so named because they contain at least two active layers, at least one of which is capable of generating charge (hereafter also referred to as "charge generating layer" or "CGL"), and at least one of which is capable of accepting and transporting charges generated by the CGL (this transporting layer is hereafter also referred to as "charge transporting layer" or "CTL"). The charge generating layer must necessarily also have a charge transporting function. A variety of configurations have been proposed for multiple active layer electrophotographic elements, including configurations in which one or more layers are repeated and configurations having additional features such as barrier layers deterring local charge transport in directions contrary to overall charge migration. Single-active-layer and multiactive layer electrophotographic elements and their preparation and use in general, are well known and are described in more detail, for example, in U.S. Pat. Nos. 4,701,396; 4,666,802; 4,578,334; 4,719,163; 4,175,960; 4,514,481 and 3,615,414. It is expected that the detector 10 of the invention can incorporate a converter 12 having any of the various single and multiple active layer configurations utilized for electrophotographic elements. Examples of suitable materials for charge transport layers are the charge transport materials and binding agents previously described. The CGL and CTL layers of such converters can optionally contain addenda used in electrophotographic elements such as leveling agents, surfactants, plasticizers, and antioxidants, as is well known in the art. A multiple active layer detector can also be configured so that the responses of different active layers are spectrally matched to different wavelength bands of high energy radiation and individual signals are provided for each band.

In preparing a single layer converter or each of the layers of a multiple layer converter, the components of the layer, including binding agent and any desired addenda, can be dissolved or dispersed together in a liquid to form a coating composition which is then coated over an appropriate underlayer. The liquid is then allowed or caused to evaporate to form the layer. One or more components, such as binding agent or charge generation agent or both, can, alternatively, be supplied as monomers or reactants and the processing of the coating composition can include steps necessary for polymerization or other reaction. Care must be taken to avoid reactions which would be deleterious to the desired characteristics of the resulting converter. Phosphor particles and any other particulates can be mixed into the coating composition at any convenient point during preparation, as long as the procedure followed is compatible with the formulation of a layer having good homogeneity and other desired properties.

Suitable liquids for the solvent and dispersant in the coating composition can be determined on the basis of convenience, compatibility with the other components of the composition and the coating method employed. Suitable organic solvents for use with many organic polymer binding agents and polymeric photoconductors, include: aromatic hydrocarbons such as benzene, toluene, xylene and mesitylene; ketones such as acetone, butanone and 4-methyl-2-pentanone; halogenated hydrocarbons such as dichloromethane, trichloroethane, methylene chloride, chloroform and ethylene chloride; ethers including ethyl ether and cyclic ethers such as dioxane and tetrahydrofuran; other solvents such as acetonitrile and dimethylsulfoxide; and mixtures of such solvents. The amount of solvent used can be varied as desired; however, it is generally convenient to use a coating composition having a high solids content, since, with most procedures, this will allow a relatively thick coating to be applied in a single step.

Concentrations of phosphor and charge generation agent in the charge generation layer or layers of the converter can be varied widely; however, it is currently preferred that the phosphor have a concentration in the charge generation layer of from about 0.010 to about 0.090 grams/cm$^2$ of detection surface and the charge generation agent have a molar ratio in the charge generation layer of from about 0.1 to about 100 moles of charge generation agent per mole of phosphor. (The concentration of phosphor is expressed in units of grams/cm$^2$ of area of detection surface. The term "detection surface" designates an imaginary plane or other surface or surfaces perpendicular to the primary x-ray beam. With a planar detector 10, the detection surface is parallel to the first and second surfaces 12a,12b of the converter 12.)

The coating composition can be applied by a variety of techniques such as doctor blade coating, spin coating, and co-evaporation. Other preparation techniques can also be used. For example, one or more layers of the converter can be prepared from a melt of the binding agent. One or more layers can be vacuum deposited. After a layer has been deposited, it can be subjected to one or more steps, such as annealing, to alter properties in a desired way.

The converter 12 is adjoined at its first and second surfaces 12a,12b by the primary and secondary electrodes 14,16. Each electrode 14,16 can be composed of nearly any substance capable of conducting electrical current and can have a wide variety of configurations; however, it is preferred that at least the electrode between the x-ray source 24 and the converter 12 have a composition and configuration that does not significantly absorb x-irradiation. One or both electrodes 14,16 can be transparent to visible radiation; however, this generally provides no particular advantage over opaque electrodes, since the converter 12 is substantially opaque. Specific examples of electrodes 14,16 include: vapor deposited metal layers such of silver, chromium, vanadium, gold, nickel, aluminum or other metal or metals; metal plates of elemental metal or alloy or oxide or combination of these materials, such as plates of aluminum, copper, zinc, brass or galvanized steel; semiconductive layers such as cuprous iodide and indium tin oxide; metal foils such as aluminum foil, and zinc foil; metal-nonmetal laminates, such as aluminum paper laminates; and conductors that rely on hydration, such as paper hydrated at a relative humidity above 20 percent.

It is desirable that the electrodes 14,16 be selected so as to optimize the Schottky barrier properties of the device. This may be done by the use of procedures, well known in the art, to choose electrode materials with the appropriate work functions and to provide contacts between the converter 12 and the electrodes 14,16 which do not significantly trap or inject electrons or holes into the apparatus. Suitable such procedures are well known to those of skill in the art and are described, for example, in *Solid State Electronic*

*Devices,* B. Streetman, 3rd edition, Prentice Hall, New Jersey, 1990, pp. 187–189; and in J. Kanicki, *Handbook of Conducting Polymers,* T. A. Skotheim, ed., Marcel Dekker Inc., New York (1986) pp. 543 et seq. Examples of such optimized electrodes commonly include deposited layers of magnesium, calcium, gold or aluminum metal.

Referring to FIGS. 1–3, the primary electrode 14 is pixellated, that is, divided into pixel units 22. The secondary electrode or the converter 12 or both can also be pixellated; but this ordinarily provides little or no improvement in image quality relative to a detector 10 having only the primary electrode pixellated. The electrodes 14,16 are initially charged by a charging system to provide a bias across the converter 12. The electrons and holes migrate to oppositely charged electrodes 14,16. Charge is collected on individual pixel units 22 which are then read out to provide a detector 10 signal modulated responsive to the modulation of the primary x-ray beam 20. It is preferred that the converter 12 have substantially uniform pixel-to-pixel response.

The signal provided by each pixel unit (hereafter also referred to as "pixel signal") is a function of the absorption of x-rays by the phosphor, the emission of actinic radiation by the phosphor, the absorption of actinic radiation by the photoconductive binder, production of electron-hole pairs by the binder, transport of charge to the pixel elements, and collection and read out of the charge from the pixel element. Pixel-to-pixel variation in the responsiveness of the detector can be accommodated by electronic signal processing; however, it is highly preferred that pixel-to-pixel variation in the responsiveness of the detector be minimized. Such variation is minimized in preferred embodiments of the invention, in two ways.

Firstly, the geometry of the pixels is adjusted relative to the imposed electrical field so that as to supply each pixel with an equal portion of the charges transported to the respective electrode, assuming uniform charge generation across the detector. With a planar detector 10 of uniform cross-section, this is straight-forward; since all pixel units 22 can be of equal area and can receive charge from subunits of the converter 12 having equal volumes. Each converter subunit (not separately illustrated) underlies, or substantially underlies, a particular pixel unit 22 and provides charge to that pixel unit 22. Converter subunits underlie respective pixel units 22, but depending on pixel size and separation, may also partially underlie adjoining pixel subunits 22 and provide some charge to those pixel subunits 22.

Secondly, differences in the composition of the individual converter subunits can be minimized. Thus, in preferred embodiments of the invention, the phosphor particles have a substantially uniform dispersal in the binder and the binder itself is substantially homogeneous. In addition, the size of pixel units 22 of the primary electrode 14, and thus the size of converter subunits, is adjusted relative to the size of phosphor particles so as to provide a large number of phosphor particles per converter subunit.

The pixellated primary electrode 14 includes pixel units 22 and read-out structures 26. Details of the primary electrode 14 can be varied to meet particular requirements. The design and preparation and use of suitable primary electrodes are known to those of skill in the art. For example, suitable primary electrodes are described in U.S. Pat. No. 5,254,480 and U.S. Pat. No. 5,313,066, which are both hereby incorporated herein by reference. The primary electrode 14 is illustrated in the Figures as receiving the x-ray beam 20 after propagation of the beam 20 through the converter 12. It is currently preferred that the secondary electrode 16 exhibit either negligible or, at least, substantially uniform x-ray absorption. This is most easily done with a non-pixellated electrode.

The detector 10 can include one or more support members 28. The support member or members 28 provide physical support and can also act as receivers for deposited layers during preparation of the detector 10. The support members 28 can also provide other functions, such as protecting the detector 10 from impacts or abrasions during use and providing fittings for connection to other apparatus. It is generally desirable that any support member positioned between the converter 12 and the x-ray source 24 exhibit minimal x-ray absorption. The materials and configurations of the support members can be varied to meet particular needs. For example, it may be convenient to prepare the primary electrode on a glass or silicon based support and then to coat the converter and secondary electrode over the primary electrode. The resulting article is relatively fragile, so additional support members, in the form of a case or shell, can be added to protect against accidental damage.

A specific example of a detector of the invention is prepared and used as follows. Poly(3-octylthiophene) is dissolved in anhydrous chloroform in an amount appropriate to form a dispersion suitable to be coated via the doctor blade technique, typical ratios of polymer to solvent are 0.5–15 wt./wt. percent. An x-ray phosphor such as $Gd_2O_2S$:Tb, is then added to the dispersion such that the ratio of phosphor to polymer is from about 0.5–20 wt %. The particle size of the phosphor should range from about 0.1–40 micrometers. The dispersion is then degassed and homogenized and coated upon a glass support on which the secondary electrode was previously deposited. The coating (polymer/phosphor layer) is about 50 to 600 microns thick A thin layer of conducting metal such as gold is then applied to the top layer of the coating via evaporation under high vacuum to form the secondary electrode. Other metals which are suitable for the secondary electrode are aluminum, calcium and copper. In the case of calcium it is necessary to provide a protective layer over the surface of the electrode to prevent oxidation. Electrical contacts are then provided to both the primary and secondary electrodes. A voltage is then applied across the device by means of an external power supply. The voltage applied depends upon the thickness of the sample and is typically in the range of $1\times10^5$ to $1\times10^6$ V/cm. As the voltage is applied the device is then subjected to modulated x-irradiation typically having an energy of about 5 to 140 kV. The charge at each pixel is then detected.

Figure 5:
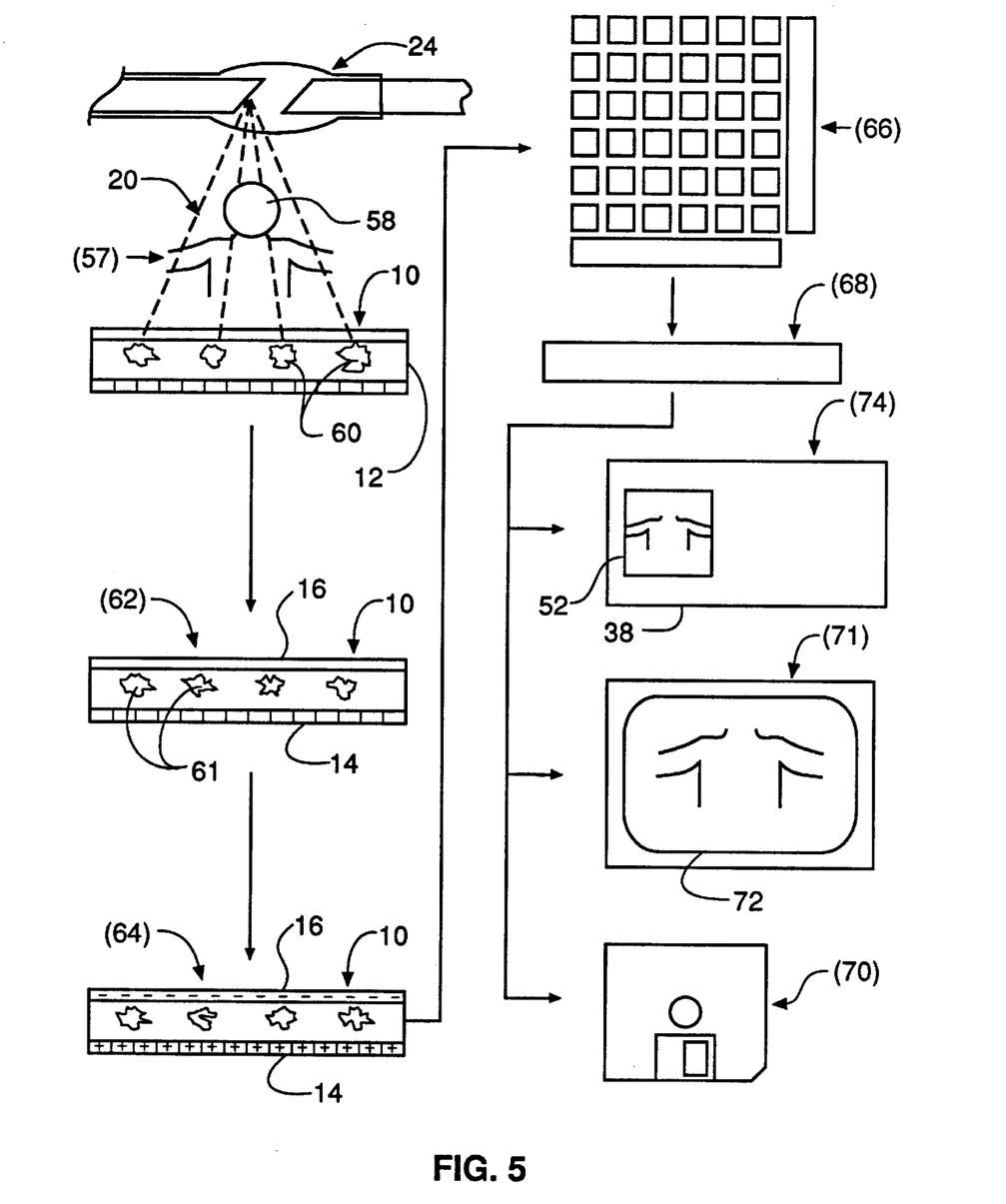
FIG. 5 is a schematic diagram of an embodiment of the method of the invention.

Referring now particularly to FIG. 1, the improved x-ray detector assembly 30 includes the improved x-ray detector 10 of the invention, a controller 32, an output system 34, a power system (indicated by dashed line 36), and a body (indicated by dashed line 38 in FIG. 1, also shown in FIG. 5). The controller 32 receives the detector signal from the detector 10, processes the signal to provide a processed signal, and transfers the processed signal to the output system 34. Respective signal lines are indicated by reference numerals 40 and 42. The power system 36 includes a main power supply 44 that provides power to the controller 32 and output system 34 by means of connectors 46. The power system 35 also includes the charger 48 that provides for biasing of the electrodes 14,16 via charger lines 50. Additional power and signal connections; for example, connections to a line voltage outlet, external status indicators, and the like; can be provided as required for a particular use.

Detailed features of the components of the improved detector 10 assembly depend to a large extent, on the features of the detector 10 itself, particularly the primary electrode 14. As previously indicated suitable primary electrodes are well known to those of skill in the art and the selection of a suitable microprocessor or other digital processing device for the controller is similarly well known to those of skill in the art. Appropriate charger characteristics for a particular detector configuration are similarly well known to those of skill in the art or can be determined by trial and error based on the disclosure provided herein.

The output system 34 either stores the processed signal, or transmits the signal in some manner to another device, or displays the processed signal to the user, or provides some combination of these functions, on an immediate or delayed basis. Components to provide any or all of these functions are well known to those of skill in the art. The separation of signal processing from storage, transmission, and display; is a matter of logical convenience in this explanation. It will be understood that signal processing need not be limited to a single component and processing, control, storage, transmission, and display functions can be supplied by a variety of equipment in a variety of manners. An example of a particular output system 34 (not shown) includes an information storage device such as a hard disc drive or compact disc writer, a transmission device such as a modem, and a display device such as a CRT display.

The detector assembly 30 of the invention can be fixed in place, for use in a single location on a permanent or long term basis or can be configured as a semiportable or portable unit. In a semiportable unit, part of the assembly 30 is movable within confines defined by the rest of the assembly 30. For example, the detector 10 can be located in a movable case connected to a fixed base unit by a tether (not shown); with the power supply and electronics provided in the base unit and the tether providing an electrical connection. With a portable assembly 30, the entire assembly 30 can be readily moved. For example, the detector 10 can be configured with a self contained power system 36 and output system 34 including an information storage unit, such that the assembly 30 can be moved about as desired between uses. (FIG. 1 is illustrative of both this embodiment and the fixed embodiment of the assembly 30.) With a portable assembly 30, an indicator (element 52 in FIG. 5) can be provided to show if the information storage unit holds signal information. The indicator can be as simple as an infrared (machine readable) or visible (human or machine readable) light emitting diode with on and off states indicative of whether the detector assembly has been used and holds signal information or is unused. As shown in FIG. 5, the indicator 52 can be a display, such as a liquid crystal display, mounted to the body 38 of the detector 10 which can indicate use and can display, for example, all or part of the image information retained in the information storage unit.

Figure 4:
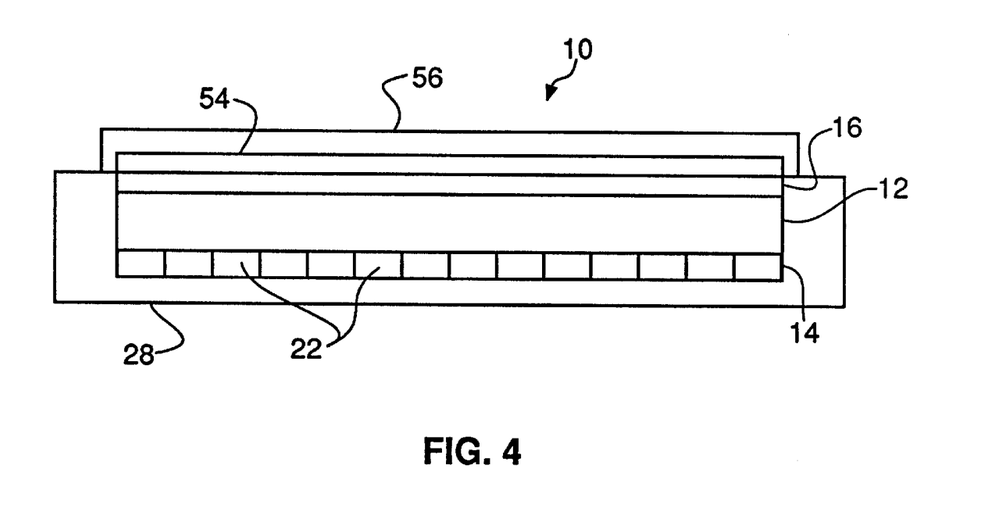
FIG. 4 is a semi-diagrammatical cross-sectional view of another embodiment of the improved x-ray detector of the invention.

If power usage presents a problem a non-electronic indicator can be utilized. Referring now to FIG. 4, an immediate image layer 54 can be provided on the detector 10 located so as be irradiated by the x-ray beam. The immediate image layer 54 can include a prompt emission radiographic phosphor that has long-afterglow properties. The immediate image layer 54 can be on a surface of the assembly 30 and can be covered with a transparent protective layer 56 so that the afterglow image remains visible to the user, under appropriate lighting conditions, for some time after x-ray exposure. The immediate image layer 54 can receive the x-ray beam 20 after passage of the beam through converter 12 or can receive the x-ray beam 20 before passage of the beam through converter 12. In the latter case, the immediate image layer 54 should not attenuate the beam so as to provide an unacceptable degradation of the resolution of the final image from the detector. The immediate image layer can alternatively be provided with a light-tight cover with provision to hold a sheet of photographic film or the like in place against the prompt emitting phosphor layer (not shown). The film could be rapidly processed if desired and the image produced could be used in association with or separate from the final image from the detector.

Referring now particularly to FIG. 5, in the method of the invention, a spatially modulated x-ray image is rendered visible. (Numbers in parentheses indicate method steps.) First, in the step labelled (57) in FIG. 5, the x-ray beam 20 emitted by the x-ray source 24 is modulated both spatially and in intensity, by the subject 58; and the x-rays impinging on the converter 12 of the improved detector 10 and x-rays are absorbed by phosphor particles 60. The phosphor particles emit actinic radiation 61 responsive to the x-rays absorbed (62), converting the x-ray image formed by the modulated x-ray beam to a latent actinic radiation image bearing image information corresponding to the modulated x-ray image. In the next step (64), the actinic radiation is then absorbed by moieties of the charge generation agent in the immediate vicinity of the emitting phosphor particles; and the moieties of charge generation agent emit electron-hole pairs responsive to the absorption of the actinic radiation. The electrons and holes migrate to the oppositely charged electrodes 14,16. The latent actinic radiation image is thus converted to a latent electrostatic image corresponding to the latent actinic radiation image. Charges of the latent electrostatic image are collected and read-out (66) converting the latent electrostatic image to a modulated electronic signal. The electronic signal is processed (68) to produce a visible final image. The signal can be stored (70) (indicated in FIG. 5 by a floppy disc) prior to or after the processing to produce the visible final image 72 (displayed (71) in FIG. 5 on a monitor 73) or both may be done simultaneously. As discussed elsewhere herein, an image can also be displayed (74) on a low resolution LCD display or the like 52 on the detector body 10 before or after other processing. Indicia can also be displayed along with or separate from the image to indicate signal conversion or storage of the signal (not shown).

The following Examples and Comparative Examples are presented to further illustrate some preferred modes of practice of the invention. Unless otherwise indicated, all starting materials were commercially obtained.

EXAMPLE 1:

An aggregate solution of the organic photoconductor was prepared as given below. A mixture comprising 49.5 wt. % polycarbonate (Lexan™), 2.5 wt. % poly(ethylene-co-2,2dimethylpropylene terephthalate), 39.25 wt. % 1,1-bis-[4-(di-4-tolylamino)phenyl] cyclohexane, 0.75 wt. % diphenyl-bis-(4-diethylaminophenyl)methane, 6.4 wt. % 4-(4-dimethylaminophenyl)-2,6-diphenylthiapyrylium hexafluorophosphate, and 1.6 wt. % 4-(4-dimethylaminophenyl)-2-(4-ethoxyphenyl)-6-phenylthiapyrylium fluoroborate was prepared as a paste. The paste was then allowed to dry. (The dry product is hereafter referred to as "seed"). A second batch of the paste was prepared and was mixed with 2.4 weight/weight percent of dry seed. The resulting CGL mixture was then diluted to 9 wt. % solids in an 80/20 (wt./wt.) mixture of dichloromethane and 1,1,2-trichloroethane. A coating surfactant, DC510, was also added at a concentration of 0.01 wt. % relative to the total CGL mixture to give the final aggregate suspension.

2.25 g of Gd$_2$O$_2$S:Tb phosphor (Nichia Chemical Co.) was then dispersed into 100 g of the final aggregate suspension and the concentration of solids was adjusted to 9.0% total solids by the addition of 25.0 g of an 80/20 (wt./wt.) mixture of dichloromethane and 1,1,2-trichloroethane. The suspension was then coated onto an indium tin oxide coated glass substrate using a 300 micron doctor blade. The thickness of the layer was estimated to be about 17 microns thick. The coating was then allowed to dry and a gold counter electrode was applied by thermally evaporating 1000 Å of gold onto the coating. Electrical contacts were then made to the electrode and counter electrode and a voltage of −110 V was apllied across the layer. The voltage was applied such that the gold electrode was negatively biased, and the indium tin oxide electrode positively biased, was connected to a transimpedance amplifier input. The signal measured in the dark at −110 V bias was 25 mV. The sample, while under −110 V, was then exposed to an X-ray flux from an HP Faxitron X-ray generator operating at 3.0 mA and 80 kVp. The sample was placed 24 inches from the X-ray source. The signal measured under X-ray flux was 280 mV.

EXAMPLE 2:

Example 2 was prepared in an identical manner as to that of example 1, except that 4.50 g of Gd$_2$O$_2$S:Tb phosphor (Nichia Chemical Co.) was added to 100.0 g of the aggregate solution and the suspension adjusted to 9% total solids. The estimated thickness of the coating prepared from this dispersion was 16 microns. An electrode and counter electrode were then applied as described in Example 1. The signal measured in the dark at −110 V bias was 120 mV. The signal measured when exposed to X-rays in the dark at −100 V bias as described above was 630 mV.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

Parts list
detector 10
converter 12
first and second surfaces 12a,12b
first and second electrodes 14,16
x-ray beam axis 18
primary x-ray beam 20
pixel units 22
x-ray source 24
read-out structures 26
support members 28
x-ray detector assembly 30
controller 32
output system 34
power system 36
body (indicated by dashed line 38)
signal lines 40,42
main power supply 44
connectors 46
charger 48
charger lines 50
indicator 52
immediate image layer 54
transparent protective layer 56
x-ray beam modulated and absorbed by phosphor (57)
subject 58
phosphor particles 60
phosphor particles emitting actinic radiation (62)
actinic radiation absorbed by charge generation agent and electron-hole pairs emitted and migrating to electrodes (64)
charges of the latent electrostatic image collected and read-out (66)
electronic signal processed (68)
signal stored (70)
final image displayed (71)
visible final image 72
monitor 73
low resolution image displayed (74)

What is claimed is:

1. An x-ray detector, for use with an x-ray source, said detector comprising:
   a converter including a mass of prompt emitting radiographic phosphor particles and a photoconductive binder, said mass of particles being dispersed and embedded in said photoconductive binder;
   whereby said phosphor absorbs x-rays emitted by said source and emits longer wavelength actinic radiation responsive to said x-rays, and said photoconductive binder absorbs said actinic radiation and produces electron-hole pairs responsive to said actinic radiation; and
   an immediate image layer disposed to receive said x-rays contemporaneous with said converter, said immediate image layer including a prompt emission radiographic phosphor.

2. The detector of claim 1 wherein said binder is substantially homogeneous.

3. The detector of claim 1 wherein said radiographic phosphor is substantially uniformly dispersed in said binder.

4. The detector of claim 1 wherein said actinic radiation emitted by said phosphor particles has a median path length of less than about 30 micrometers.

5. The detector of claim 1 wherein said converter is substantially opaque to said actinic radiation emitted by said radiographic phosphor.

6. The detector of claim 1 wherein said radiographic phosphor further comprises a dispersed mass of particles, said particles having a median particle size of from about 0.5 to about 40 micrometers.

7. The detector of claim 1 wherein said binder includes a photoconductive polymer.

8. The detector of claim 1 wherein said binder includes a non-polymeric photoconductor.

9. The detector of claim 1 further comprising radiation absorbing pigment dispersed in said binder.

10. The detector of claim 9 wherein said pigment is x-ray absorbing.

11. The detector of claim 9 wherein said pigment is absorptive of said actinic radiation.

12. The detector of claim 1 wherein said converter has opposed first and second surfaces and further comprising a primary electrode and a secondary electrode disposed on said first and second surfaces, respectively, at least one of said electrodes being at least partially transparent to x-radiation.

13. The detector of claim 12 wherein at least one of said electrodes is pixellated.

14. The detector of claim 12 wherein said secondary electrode has a plurality of pixel units, said pixel units each collecting charge from said converter adjacent the respective said pixel unit to collectively produce a detector signal responsive to said x-radiation.

15. A detection assembly comprising the detector of claim 14, an information storage unit, and means for transferring said detector signal to said information storage unit for storage.

16. The detection assembly of claim 15 further comprising a power supply; a body supporting said detector, information storage unit, means for transferring, and power supply; and means for transferring said detector signal to a remote location.

17. The detection assembly of claim 16 further comprising a status indicator having at least two machine or human readable states indicative of the storage of said detector signal in said information storage unit.

18. The detection assembly of claim 16 further comprising a display mounted to said body, said display rendering a visible image responsive to at least part of said x-radiation.

19. The detector of claim 1 wherein said phosphor of said immediate imaging layer has a long-afterglow.

20. A x-ray detector, for use with an x-ray beam source, said detector comprising:

at least one primary electrode; and a plurality of imaging subunits, said subunits each including:

a secondary electrode; and a converter disposed between said primary and secondary electrodes, said converter including a prompt emitting radiographic phosphor and a binder, said radiographic phosphor being dispersed in said binder, said binder being photoconductive; and an immediate image layer disposed to receive said x-rays contemporaneous with said converter, said immediate image layer including a prompt emission radiographic phosphor.

\* \* \* \* \*